(12) United States Patent
Cherubini et al.

(10) Patent No.: US 7,436,748 B2
(45) Date of Patent: Oct. 14, 2008

(54) STORAGE DEVICE AND METHOD FOR OPERATING A STORAGE DEVICE

(75) Inventors: Giovanni Cherubini, Rueschlikon (CH); Evangelos S. Eleftheriou, Zurich (CH); Charalampos Pozidis, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 10/441,344

(22) Filed: May 20, 2003

(65) Prior Publication Data

US 2004/0047275 A1    Mar. 11, 2004

(30) Foreign Application Priority Data

May 23, 2002    (EP)    .................................. 02405415

(51) Int. Cl.
*G11B 7/00*    (2006.01)
(52) U.S. Cl. ....................................... 369/101; 369/126
(58) Field of Classification Search ................. 369/126, 369/59.19, 101
See application file for complete search history.

(56) References Cited

U.S. PATENT DOCUMENTS 5,375,114 A * 12/1994 Hatanaka et al. ............ 369/126
6,603,622 B1 * 8/2003 Christiansen et al. ......... 360/66

FOREIGN PATENT DOCUMENTS

| JP | 63-000828 | 1/1988 |
| JP | 11-296897 | 10/1999 |

* cited by examiner

*Primary Examiner*—Wayne Young
*Assistant Examiner*—Van T Pham
(74) *Attorney, Agent, or Firm*—Cantor Colburn LLP; Pete Tennet

(57) ABSTRACT

A storage device and a method for operating a storage device. A storage medium for storing data in form of marks is scanned by at least one probe in a scanning mode. A control unit provides a pulsed reading signal for data detecting purposes in said scanning mode. Said storage medium comprises marks for determining a clock of said pulsed signal.

12 Claims, 7 Drawing Sheets

(a)

STORAGE DEVICE AND METHOD FOR OPERATING A STORAGE DEVICE

TECHNICAL FIELD

The present invention relates to a storage device and to a method for operating a storage device.

BACKGROUND OF THE INVENTION

New storage concepts have been introduced over the past few years. Exploiting the capability of imaging and investigating the structure of materials down to the atomic scale achieved by scanning tunneling microscopy (STM) and atomic force microscopy (AFM), probes having a tip are being introduced for scanning appropriate storage media, where data are written as sequences of bits represented by indentations and non-indentations. According to latest demonstrations, indentations with a diameter of the range of 30-40 nm have been written on appropriate storage media. These data storage concepts promise ultra-high storage areal densities.

First approaches are disclosed in "High-density data storage using proximal probe techniques" by H. J. Mamin et al., IBM Journal Research Development, Vol. 39, No. 6, November 1995. A single tip of an AFM cantilever is placed in contact with a rotating surface of a polycarbonate storage medium. Bits are represented by indentations or non-indentations written on the storage medium. Writing on the storage medium is accomplished by heating the tip with a pulsed infrared laser. With the tip being in contact with the storage medium, the heated tip softens the polymer surface. As a force is applied to bring the tip in contact with the surface, the tip creates a small indentation. A mechanical reading mechanism is adopted. As the tip rides over the surface of the storage medium, a topographic indentation causes a deflection of the cantilever. This deflection is detected using a standard optical sensor.

"High-Density Data Storage Based on the Atomic Force Microscope", by H. J. Mamin et al., Proceedings of the IEEE, Vol. 87, No. 6, June 1999, discloses another single tip based storage device with a rotating disk as storage medium. A single tip at the end of an AFM cantilever is placed in contact with a rotating surface of a polycarbonate storage medium. Bits are represented by indentations or non-indentations in the storage medium. Writing is accomplished by heating the tip electrically via two conducting legs, which are connected with the tip. Reading is accomplished with a piezoresistive sensor, sensing the deflection of the cantilever when scanning an indentation.

Applicant's U.S. Pat. No. 5,835,477 discloses a storage device with a recommendation for rewriting such a storage device. The storage device comprises a circuit for distinguishing between information which is to be erased from a first section of the storage medium and information which is not to be erased in this section. The information not to be erased is copied into another section of the storage device. Afterwards, the first section can be erased.

"The Millipede—More than one thousand tips for future AFM data storage" by P. Vettiger et al., IBM Journal Research Development, Vol. 44, No. 3, May 2000, shows a data storage device based on a mechanical x-/y-scanning of a storage medium with an array of probes each having a tip. The probes are scanning assigned fields of the storage medium in parallel, so high data rates can be achieved. The storage medium comprises a thin polymethylmethacrylate (PMMA) layer. The probes are scanning the polymer layer in a contact mode.

The contact mode is achieved by applying small forces to the probes so that the tips of the probes can touch the surface of the storage medium. Therefore spring cantilevers are carrying the sharp tips on their end section. Bits are represented by indentations or non-indentations in the polymer layer. The cantilevers respond to these topographic changes in the surface.

Indentations are written on the polymer surface by thermomechanical recording, whereas the local probe is heated with a current or voltage pulse during the contact mode, so that the polymer layer is softened locally where the tip touches the polymer layer. The result is a small indentation in the layer, having nanoscale diameter. Reading is also accomplished by a thermomechanical concept. The heater cantilever originally used only for writing is given an additional function of a thermal reading sensor by virtue of its temperature dependent resistance. For reading purposes, the resistor is operated at a temperature that is not high enough to soften the polymer as is necessary for writing. The thermal sensing is based on the fact that the thermal conductance between the probe and the storage substrate changes when the probe is moving into an indentation, as the heat transport will be more efficient. Consequently the heater's temperature and hence its resistance will decrease. Thus, changes of the continuously heated resistor are monitored while the cantilever is scanned over a corresponding data field.

For reasons of power conservation, periodic current or voltage pulses of short duration, rather than DC current or DC voltage, are applied to the cantilevers in order to heat the cantilever to the appropriate temperature for reading purposes. In addition, applying a DC current or a DC voltage would increase the heat transferred to the storage medium and reduce its average lifetime.

Since the storage medium is moved relatively to the probes with a certain velocity, every T seconds a reading pulse has to be fired to the probes for mark and therefore data detecting purposes. As used herein "mark" is understood as physical representation of an information unit. Referring to prior art storage devices, marks are indentations and non-indentations for instance. T corresponds to the time it takes for a probe to scan the distance between the center of two consecutive marks at a given scanning velocity. The duration of such reading pulses is small compared to the time it takes for a probe to scan over a mark. Accurate timing of the pulses becomes critical, since the amplitude of a response signal caused by a reading pulse drops as the probe moves away from the center of an indentation mark. As a result optimum data detection is obtained if reading pulses are fired whenever the probe is in a position corresponding to the center of a mark. By "optimum data detection" is meant that the probability of detecting a bit corresponding to a certain value, given that a bit corresponding to the opposite value has been stored, is minimized. But even firing a pulse at the right time once, and therefore showing an accurate clock phase to meet the center of a mark, is no guarantee for meeting the centers of following marks with succeeding pulses. This may be due to variations of the scanning velocity or to variations of the clock phase or frequency.

Accordingly, it is a challenge to provide a nanoscale storage device and a method for operating the storage device with an accurate timing for firing reading pulses in a scanning mode.

SUMMARY OF THE INVENTION

According to one aspect of the invention, a storage device is provided having a storage medium for storing data in form of nanoscale marks, having at least one probe designed for scanning the storage medium in a scanning mode, and having a control unit providing a pulsed reading signal for data detecting purposes in the scanning mode, wherein the storage medium comprises marks for determining a clock of the pulsed signal.

A mark can usually represent one of at least two different logic values, therefore representing at least a binary digit. Marks representing more logic values than two are also contemplated. Marks according to the invention are not limited to certain physical properties. Marks can be represented by topographic properties on or in the storage medium or by electrical properties or by optical properties, or even by chemical properties. Marks can for example be represented by charge trap properties in a semiconductor-oxide-dielectric structure. Or have amorphous or crystalline phase properties to be detected. Marks can be arranged in form of topographic properties in a polymer layer. The physical way of reading or writing marks is not limited: preferably thermomechanical reading and writing processes can be used. Thus, the storage medium is not limited in its physical structure, except that it can be scanned by one or more probes. Each probe preferably has a tip for nanoscale scanning. A probe having a tip is also referred to herein as tip shaped probe.

For mark detection and therefore data detection purposes, a pulsed reading signal is used. The recipient of the pulsed reading signal is preferably the probe performing reading operations, especially when the storage medium is read thermomechanically.

Clock marks represent operational data in a way such that when these clock marks or clock mark patterns are scanned and read, a clock for the pulsed reading signal can be derived, for example, by applying determination methods. The clock basically guarantees the right timing of firing the pulses, with frequency and phase being parameters of the clock. Frequency and/or phase of the determined clock can shift from pulse to pulse. One or both parameters of the clock can be continuously controlled.

The invention supports determining essential clock data that allows the storage device to perform its reading operations with high accuracy. A small fraction of the storage medium is necessary for storing marks for timing recovery purposes. So overhead due to the timing recovery operation is also small.

A major advantage is that the same reading technique is applied to clock marks as well as to other data marks, so that no further exceptional expenditures are necessary to pick up the clock information. Uniform scanning of clock marks and data marks is achieved.

Finally providing pulsed reading signals with correct timing provides for high data quality, high resolution, and consequently small probability of error or loss of data. In case clock tracking is applied, small clock jitter and hence small clock error rates are achieved. In the end, reliable data detection with a pulsed signal is achieved, consuming significantly less power and heat than reading with a constant DC signal.

In a preferred embodiment the control unit provides the clock marks scanning probe with oversampling reading pulses in a clock mark scanning mode. The control unit comprises an input for a response signal to the oversampling reading pulses, and the control unit comprises a determination unit for determining the clock dependent on the response signal. In case there is only one tip shaped probe scanning the storage medium, oversampling reading pulses are applied to this probe. In case there are more tip shaped probes in order to scan marks in parallel, preferably one of the probes is committed to scan the clock marks. Then only this probe is provided with oversampling reading pulses.

Reading pulses cause a response signal that shows in its course the deflection of the probe, e.g. due to topographic mark structures. As the velocity V of the probes during the scanning across the storage medium is known, and a distance S between two consecutive marks is also known, only one reading pulse for data detection is to be fired every T seconds, with $T=S/V$, provided the pulse is applied at the right time when the probe meets the mark center. Since this instant is not known, a series of pulses is fired within the period T for sampling the deflection of the probe during its motion from clock mark to clock mark. Applying these reading pulses with a rate higher than $1/T$ is called oversampling. Oversampling helps determine at which instant the probe meets the mark center. This is preferably achieved by an estimation circuit being a part of a clock determination unit. Finding out this instant by the estimation circuit determines a clock for future reading pulses with a frequency and a phase, such that the reading pulses are applied at instants approximating the instants at which the probe is crossing the mark center. For this initial clock determination, the storage medium preferably includes a certain clock mark pattern. This clock mark pattern preferably comprises exclusively clock marks, that cause the probe to deflect. In case, a mark can be represented by an indentation or a non-indentation, the clock mark pattern contains a series of indentations, usually representing a binary value "1".

In another preferred embodiment, the storage medium comprises another clock mark pattern for determining the clock. This second clock mark pattern helps to further adjust the clock determined by the above mentioned first approximation. This process is called clock tracking. The clock determination unit therefore comprises preferably a second order loop filter that is used to determine the adjustments for the clock phase.

In another preferred embodiment, the storage medium comprises in addition a threshold mark pattern for determining a threshold for mark classification purposes. When detecting a mark by means of applying a reading pulse, the response to this reading pulse has to be evaluated for certain criteria. This evaluation can include a comparison of the response signal to a threshold. In case the response signal exceeds the threshold an indentation and e.g. a binary "1" is detected, otherwise a binary "0" is detected. Thresholds in general help to classify the response signal and to decide which one of possibly several values is represented by the mark being detected. A corresponding mark pattern is used to determine the threshold level. In case, a mark can be represented by an indentation or a non-indentation, the threshold mark pattern contains a series of indentations, usually representing a binary value "1". By applying oversampling again, the values of the response signal obtained at the estimated instant at which the probe meets the mark center and at another instant that is spaced $T/2$ seconds from the first instant are identified within one period T. In a further preferred embodiment, the control unit comprises an averaging unit for determining the threshold by applying averaging steps, preferably by computing average values out of the response values. The average values over several intervals of duration T can be averaged again with the final result representing the threshold.

As both the first clock mark pattern and the threshold mark pattern preferably contain indentation marks, representing "1's", these patterns can be merged into a common clock and threshold mark pattern, even when determining a first clock approximation and the threshold in parallel.

In another preferred embodiment, the storage medium comprises an indication mark pattern indicating the beginning of the second clock mark pattern. Following the scanning direction of the probe, a preferred mark pattern sequence is a first clock mark pattern, a threshold mark pattern, indication mark pattern, and second clock mark pattern. Thus, the indication mark pattern shows when the second clock mark pattern is beginning. Recognizing the beginning of this second clock mark pattern is crucial for several reasons. First, the first clock mark pattern, the threshold mark pattern and the indication mark pattern are preferably arranged together in a header field. This header field is scanned in an oversampling mode with no other marks representing stored data or the like being read simultaneously. Alternatively, parallel scanning of data fields with an array of tip shaped probes is preferred for achieving high data rates. The second clock mark pattern is preferably not arranged in the header field but in a clock mark field that is scanned and read by its associated probe simultaneously when other data fields are read by their associated data field probes. This leads to an ongoing and substantially continuous adjustment of the clock while scanning the entire fields. In this preferred concept, the header field is arranged adjacent to only one of the other fields in a kind of exposed position, in order to allow initial timing recovery and threshold determination before reading pulses are fired to the probes scanning the data fields. Once the header field is read by firing the oversampling pulses to the probe scanning the header field and once the clock is determined and the threshold is eventually determined, the scanning probe moves over to the clock mark field comprising the second clock mark pattern. At this time simultaneous reading of many data fields with their associated probes is started. This is because of the arrangement of the fields on the storage medium. In this sense, the scanning probe cannot detect the beginning of the clock mark field with the second clock mark pattern unless an indication mark pattern is present. On the other hand, this transition information is essential, since with the beginning of the clock mark field, the data reading process starts with many other data fields. So from this moment, reading pulses have to be fired with the determined clock in order to read data and get a response signal. Therefore, the indication mark pattern characterizes the transition from the header field to the clock mark field and consequently the start of reading data. Preferably this indication mark pattern comprises alternating indentation and non-indentation marks for indicating the end of the header field. Hence, the control unit comprises an indication pattern detection unit, typically including a correlator filter.

As indicated above, the storage device includes in another preferred embodiment an array of tip shaped probes. The storage medium has fields with each field to be scanned by an associated one of the probes. One of the fields comprises the clock marks for at least the second clock mark pattern. According to the invention, a field is defined by a collection of marks, all of them scanned by the same probe, which probe is responsible for scanning its associated field. Usually the probe is exclusively responsible for scanning its associated field with no other probe scanning the field, but exceptions might be allowed for special scanning operations. On the other hand, a single probe can be associated to several fields for performing scanning operations. Providing one field with the clock marks leads to small loss of capacity, the field with clock marks usually having the same properties as all the other data storage fields. The overall benefit of such a multi-probe-array is that scanning of many or even all fields can be exercised in parallel. According to the use of tip shaped probes being capable of high density mark scanning, clock mark data can be reached quickly and actions following the clock mark scanning can be introduced while continuing scanning other fields. Full parallelism is supported.

In another preferred embodiment, the field comprising clock marks exclusively comprises marks representing data for operating the scanning mode. This operational data gives information on how scanning mode is to be operated or adjusted. This may include the way probes are positioned or aligned over or on the surface medium, but is not restricted to. Operational data for operating the scanning mode provide operation for operating the storage device in such a manner that stored data can be read and to be stored data can be stored, but does not include information on data storage management or the like. The purpose of the control data is on technically operating the storage device. Such an embodiment is very advantageous, since preferably a scanning mode is applied to scanning all or at least a majority of fields in parallel. Thus, the clock mark field is scanned from its beginning to its end simultaneously with many other fields. Consequently this preferred embodiment allows, that clock marks can be scanned and read simultaneously with data marks and therefore the clock can be updated until scanning the very last marks of each field, since the clock mark field also delivers clock information even with its very last marks. This leads to a control loop for adjusting clock constantly while scanning a field, the adjusting steps being executed with a small time constant.

In another preferred embodiment, each of the fields has a plurality of tracks for an associated probe to follow in the scanning mode. Correspondingly, the probes are aligned in a two dimensional array. In the scanning mode each probe meets a track in its associated field. The storage device is set up in two dimensions with the ability to store data with high density. In another preferred embodiment, each of the fields has a plurality of straight line tracks, the tracks being arranged in parallel. In contrast to circular arranged tracks on rotating storage media, this embodiment is designed for x-/y-scanning and especially for parallel x-/y-scanning of many storage fields, as the shape of the tracks determines the scanning direction and therefore the relative movement between probes and storage medium.

In another preferred embodiment, the header field and the clock mark field have the same number of tracks, and each of the tracks include the same mark patterns. Due to provision of identical mark patterns in each track, the clock can be determined when scanning each track.

In another preferred embodiment, the control unit is designed for applying the pulsed reading signal to many or even all the probes during scanning of the storage fields. In terms of minimizing the ratio of clock marks to the total number of marks in the entire storage medium, in a first step only one field has to be provided with the clock marks, especially with the second clock mark pattern. These clock marks are responsible for determining the clock for reading processes of all the other storage fields. These reading processes include firing reading pulses with the rate 1/T when the probes meet the mark center positions. This preferred embodiment avoids forcing every single field into storing its own clock marks. Appropriate electrical circuits are provided for each of the storage fields for generating reading or writing or erasing pulses with a frequency and a phase determined by the clock.

In another preferred embodiment, the storage medium comprises at least a second field with clock marks. Due to the fact that a clock field delivers clock information to many or even all data fields, a damaged first field or a damaged tip corresponding to this field might inhibit scanning or at least reading all the other data fields. Providing at least a second field with clock marks can overcome the drawback and guarantee scanning operations even in case the first field is damaged, for example due to scratches.

In another preferred embodiment, the probes comprise a cantilever and a tip. These probe embodiments are arranged to perform contact scanning. The cantilever has spring-like properties.

In another preferred embodiment, the clock marks have basically the same shape as stored or to be stored marks representing data. Clock marks as well as data marks are preferably written in the same technique and therefore show the same basic shape. This lowers efforts in generating clock mark patterns. A single writing technique can be applied irrespective of writing clock or data marks.

In another preferred embodiment, the marks are characterized in the topographic properties of a storage medium layer. Topographic marks support contact mode scanning with cantilever based probes.

In another preferred embodiment, the marks are either indentations or non-indentations in the layer. This embodiment supports thermomechnical writing techniques. In thermomechanical writing, the tip is heated while pressed on an appropriate layer of the storage medium, polymer layers are preferred, and generates an indentation, when a region under the tip melts.

In another preferred embodiment, the indentation shaped marks have approximately symmetrical conical walls in cross section. This shape is a result of above mentioned thermomechanical writing. Advantage of that kind of indentation shape is that with sharp tips high resolution scanning can be performed. When scanning this kind of indentation marks, not only the existence of an indentation can be detected, but also the position where the tip is crossing the indentation within an indentation mark. In case the tip is positioned within a side wall of the indentation away from the center, this can be detected.

A further embodiment of the storage device comprises a protection circuit for non-erasing or non-rewriting clock marks. In contrast to marks representing non-operational data, that is, data marks, which might be rewritten or erased by users of the device, clock marks including also marks of the threshold pattern and the indication pattern should be stored on the storage medium permanently since their information has to be available for every scanning process. At least in case such marks are erasable or rewritable, the protection circuit is designed for inhibiting any erasing or rewriting of these marks. The design of such a protection circuit depends on the way marks on the storage medium are generally erasable or rewritable. In case erasing or rewriting is achieved thermomechanically by applying high-current pulses to the probes to generate heat for melting parts of the storage medium, a preferred protection circuit comprises current limiting means connected to the operational data field scanning probes after the clock marks have been written. Writing of the clock marks is preferably performed by the manufacturer of the storage device.

According to another aspect of the invention, a method is disclosed for operating a storage device, comprising scanning clock marks of a storage medium with a probe, providing reading pulses for clock mark detecting purposes, determining a clock in dependence on the response to the reading pulses, and scanning marks of the storage medium representing data and providing a pulsed reading signal for data detecting purposes, the reading signal being generated with the clock.

In another preferred embodiment data marks are arranged in fields of the storage medium, the fields are scanned simultaneously with additional probes, and reading operations of all of the fields are performed with the pulsed reading signal.

In another preferred embodiment, clock marks are read with oversampling reading pulses.

In another preferred embodiment, the clock is determined in a first step when a corresponding first clock mark pattern is scanned.

In another preferred embodiment, an initial phase adjustment of the clock is estimated using a correlation method.

In another preferred embodiment, the initial phase adjustment is determined before the pulsed reading signal is applied for data mark detection purposes.

In another preferred embodiment, the determined clock is adjusted in a second step when another clock mark pattern is scanned.

In another preferred embodiment, the clock is adjusted simultaneously while applying reading pulses to data marks.

In another preferred embodiment, a threshold for mark classification purposes is determined when a threshold mark pattern is scanned.

Advantages of the method and its embodiments correspond to the advantages of the inventive apparatus and its embodiments described above.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

FIG. 3a is a perspective view of a tip shaped probe, and FIG. 3b is a cross sectional view of an indentation mark, written by the tip shaped probe according to FIG. 3a.

FIG. 9a is a block diagram of an indication pattern detection circuit according to the present invention, and FIG. 9b shows a pattern of a corresponding multiplier output value, while FIG. 9c shows a corresponding multiplier output signal.

Different figures may contain identical references, representing elements with similar or uniform content.

DETAILED DESCRIPTION

Figure 1:
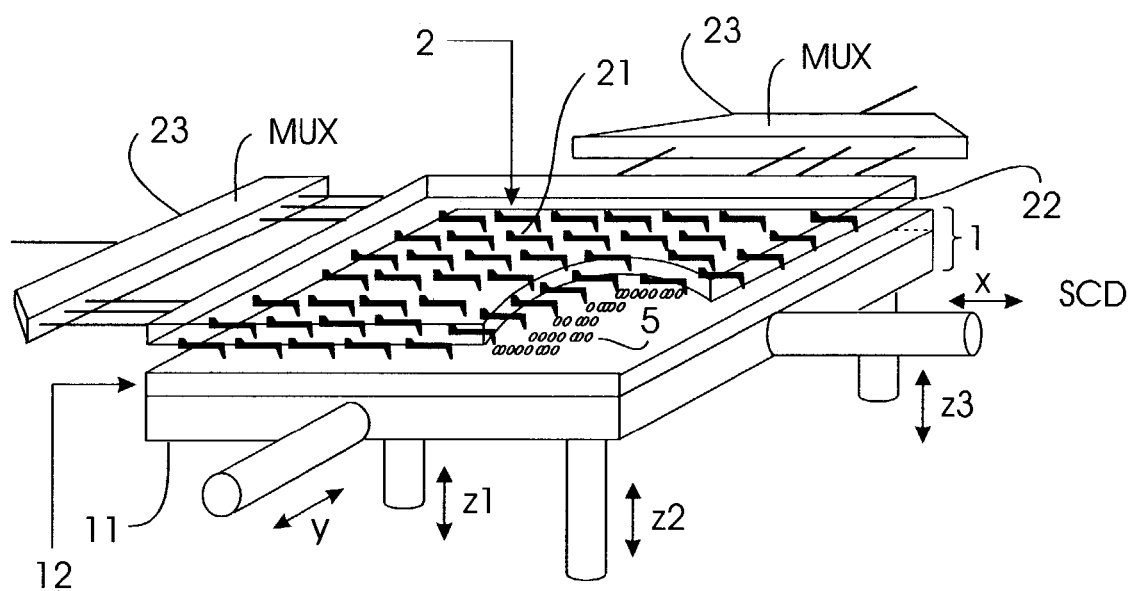
FIG. 1 is a perspective view of a storage device in accordance with the present invention.

FIG. 1 shows a perspective view of a storage device in accordance with the present invention. A storage medium 1 comprising a substrate 11 and a polymer layer 12 is facing a probe array 2 having a plurality of probes 21.

Figure 3:
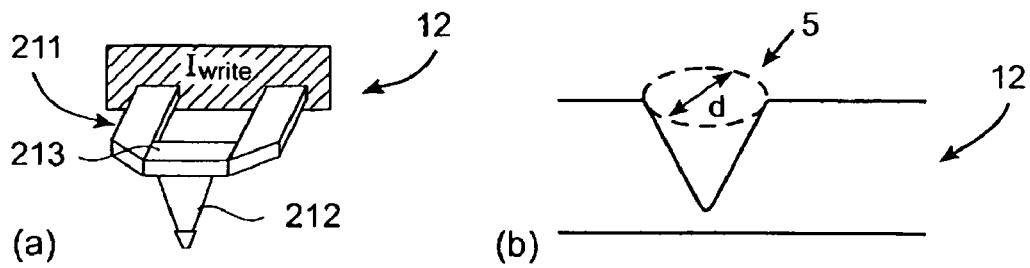

Probes 21 are mechanically linked to a linking element 22 having the shape of a plate. The linking element 22 is transparent and cut open at one edge solely for illustrative purposes. FIG. 3a shows a perspective view of a single probe 21. The probe 21 comprises a spring cantilever 211 with a tip 212 at its end. The cantilever 211 is sensitive to vertical forces. The probe 21 further comprises a heater platform 213 between legs of the cantilever 211 and the tip 212.

Marks are written on the storage medium using a thermomechanical technique. A local force is applied to the polymer layer 12 by the probe 21. Polymer layer 12 is softened by heating the heater platform 213 with a current or voltage pulse during contact mode, so that the polymer layer 12 is softened locally where the tip 212 touches the polymer layer 12. The result is a small indentation mark 5 in the polymer layer 12 according to FIG. 3b, having nanoscale diameter d.

In order to read data, the polymer layer 12 is moved under the probe array 2 at a constant velocity. The scanning velocity and the distance between marks determine the data rate of the system in marks/bits read or written per second. Reading is also accomplished with a thermomechanical concept. The heater cantilever 211 used for writing is given the additional function of a thermal reading sensor by exploiting its temperature dependent resistance. For reading purposes, the resistor is operated at a temperature that is not high enough to soften the polymer layer 12 as is necessary for writing. For reasons of power conservation, periodic current or voltage pulses of short duration are applied to the cantilevers in order to heat the cantilever to the appropriate temperature for reading purposes, rather than a DC current or DC voltage. This pulsed reading signal determines operating temperature at the cantilevers for data readout. Data detection is performed by monitoring the current or voltage signals resulting from the application of reading pulses to the cantilever as it scans over tracks. The thermal sensing is based on the fact that the thermal conductance between the probe 21 and the storage medium 1 changes when the probe 21 is moving into an indentation mark 5 as the heat transport will be more efficient. The probe temperature drops due to more efficient heat transport through air, as the cantilever tip 212 moves into a polymer indentation mark 5 where the distance between heater and polymer is reduced. Since indentation marks 5 do not have vertical walls in practice, they are modeled as conical indentations of the storage medium 1, see FIG. 3b. During motion of the tip 212, the temperature change of a heated cantilever 211 is gradual as it moves from a mark edge down towards its center, where the mark depth is maximum. Consequently the heater platform temperature and hence its resistance will decrease. Thus, changes of the heated resistor values could be monitored while the cantilever 211 is scanned over data marks.

Solely for demonstration purposes, marks 5 are shown only in a confined area of the storage medium 1 in FIG. 1.

The probes 21 are scanning the entire storage medium 1 either by moving the probe array 2 relatively to the storage medium 1 or vice versa. In FIG. 1 the storage medium 1 is moved while the probe array is fixed in its position. Arrows x and y indicate the scanning direction, while z arrows indicate an approaching and leveling scheme in vertical direction for bringing the entire probe array 2 into contact with the storage medium 1.

The storage medium 1 is divided into fields, not explicitly shown in FIG. 1. Each probe 21 of the array 2 scans, e.g. writes or reads, only its own data field. Consequently a storage device with for example 32×32 probes will include 32×32=1024 fields.

Figure 2:
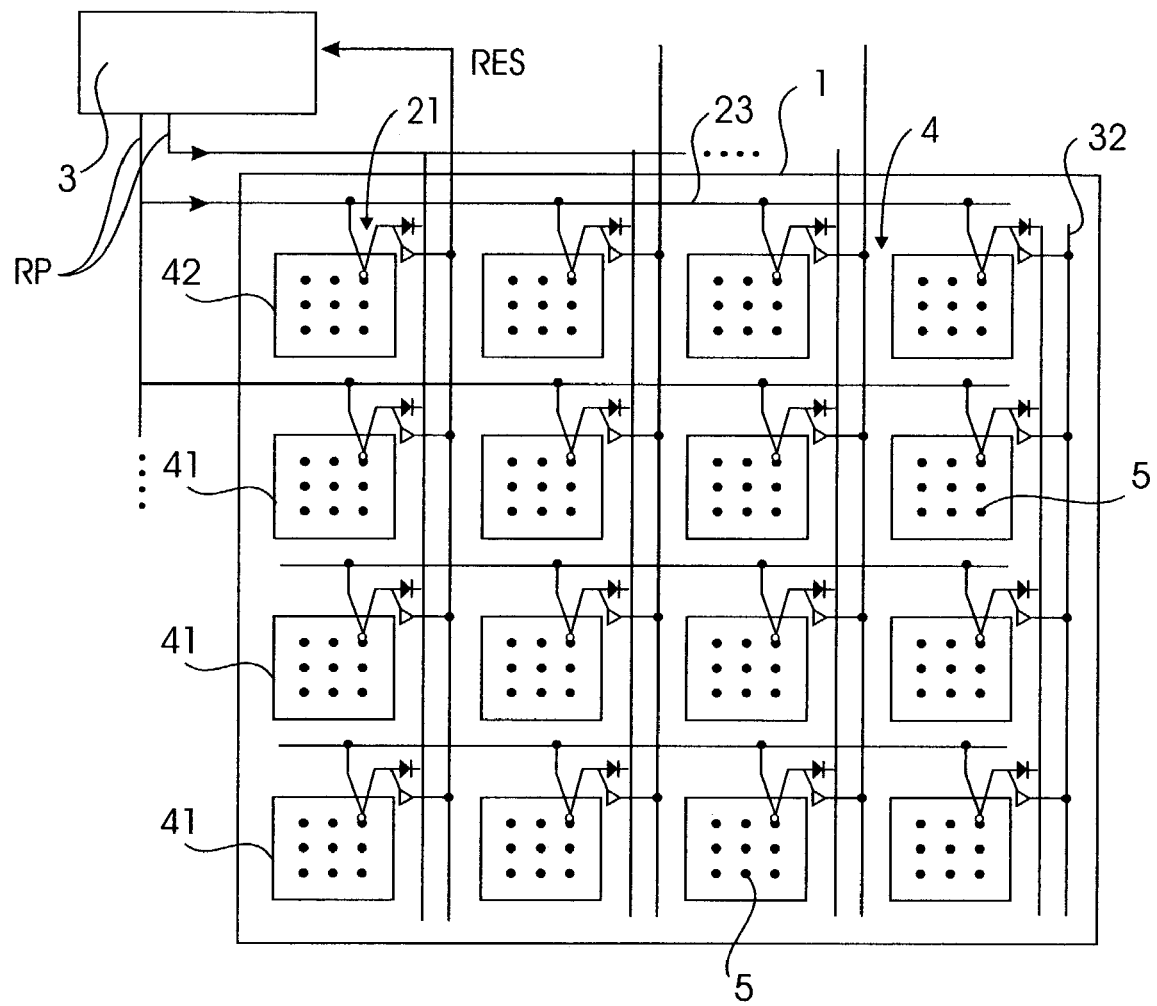
FIG. 2 is a top view of a storing medium with a illustrative probe array in accordance with the present invention.

At least one of these fields, not shown explicitly in FIG. 1 but shown in FIG. 2 with the reference 42, comprises marks 51 for determining a clock of the pulsed reading signal used by the storage device for applying pulses to the cantilevers for data reading purposes. Only when these pulses are fired and the cantilever simultaneously meets a mark center or is close to a mark center, can reliable data detection be obtained. During normal operation, one such pulse is fired every T seconds—corresponding to the horizontal distance of the marks 5 and the scanning velocity. The duration of such a pulse is small compared to the time it takes for the cantilever to move in and out of the mark 5.

The clock mark field is preferably prewritten by the device manufacturer, while the other data fields are not prewritten with data when case the storage device has rewritable properties, but are prewritten with data in case the storage device is read only.

The storage device is preferably operated with row and column time-multiplexing addressing, schematically shown by multiplexers 23. The storage device according to FIG. 1 is ready for parallel scanning of all fields. Storage fields might also be scanned row by row or column by column. Every movement of a single probe 21 is applied to all the other probes 21 due to mechanical coupling of the probes 21.

FIG. 2 presents a illustrative top view of a storage medium 1 with four times four fields 4 arranged in rows and columns. Each field comprises marks 5. There are nine marks 5 disclosed within each field 4. This amount is of course not of true nature but only illustrative, as it is customary for these kind of storage devices to pack as much data marks on the storage medium 1 as resolution allows. All of the depicted fields 4 are data storage fields 41, except the field 42 in the upper left corner containing exclusively operational data for running the storage device. This field contains clock marks 51 for deriving the clock of the pulsed reading signal, that is applied for reading all the other data fields 42. The fields 4 are bordered in order to make them visible. Such borders in forms of grooves might also be placed on the storage medium 1 for defining the beginning and the end of a field 41, 42, but this is not necessarily the case. Rather, fields 4 are defined by the extent of marks 5 a single probe 21 is responsible for.

In addition, only a few of illustrative tip shaped probes 21 are shown in a scanning position touching every one of fields 41 and 42. The probes 21 are electrically connected with a time multiplexer 32, represented illustratively with common wires in FIG. 2.

The upper left probe 21 is scanning the clock mark field 42. Only some of the probes 21 are illustratively shown to provide clarity in the drawing. The upper left probe is connected to a control unit 3. The control unit 3 outputs a pulsed reading signal RP, that is provided to the probe of every field for mark detection purposes and therefore reading purposes. Oversampling reading pulses are assigned to the clock mark field 42. A response signal RES to this oversampling reading pulses is fed to a determination part of the control unit 3, which is not shown explicitly in FIG. 2. This determination unit derives a clock of the pulsed reading signal RP from information delivered from the response signal RES. The determination unit 31 itself as well as the entire control unit 3 may comprise a microcomputer with respective software programs, or hardware, or be embodied partly as hardware logic and partly as software, or be embodied else. The determination unit 31 can be part of an overall device control unit 3 or can be a separate unit. In general the term unit is understood rather as a function than as a physical unit.

Redundancy basically means repeating the same information in several spatially separated areas of the storage medium in order to increase robustness to disturbances. Clock marks can be repeated within a field in order to be able to determine clock continuously. In the coarse level, an entire clock mark field can be duplicated to at least one more field of the array and therefore to a different area of the storage medium. The benefit of this embodiment is, that clock information can be generated at a sufficient frequency and once a clock mark field is destroyed due to scratches, media defects or other media-dependent imperfections, scanning information can be derived from another source, that is the further clock mark field.

Figure 4:
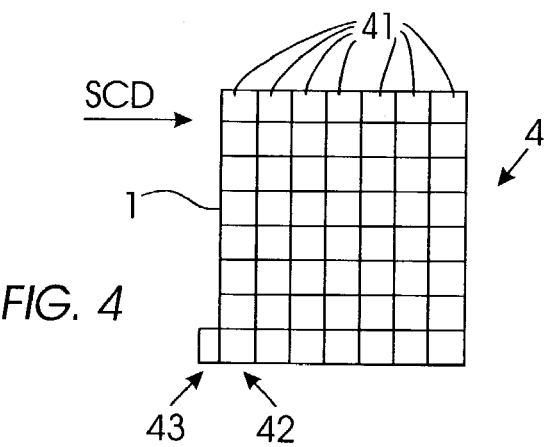
FIG. 4 illustrates a storage medium in top view according to the present invention.

Preferably, several parameters are estimated prior to data detection. Besides clock phase and clock frequency, gain of an overall read channel is determined, and it is also necessary to identify the boundaries of data records. Therefore it is advantageous to provide a field on the storage medium called the header field, that contains marks, which allow determining these parameters. FIG. 4 shows such a storage medium 1 with an array of fields 4 in top view, fields 41 with marks representing data, and a single field 42 with marks representing clock marks, and a header field 43 with marks used for determining the above mentioned parameters that are fundamental for further data acquisition. It is apparent from FIG. 4 that due to the position of the header field 43, this header field 43 is scanned first from its associated probe in a scanning mode. Assuming scanning in a scanning direction SCD, all the other probes in the column of the header field scanning probe are not able to scan marks due to the lack of marks and consequently the lack of fields above the header field 43. Probes of other columns might scan respective marks while the header field 43 is scanned by its associated probe due to the simultaneous motion of the entire array of probes. But reading pulses are preferably not applied to theses probes during this period. Alternatively probes of other columns might not even scan marks due to lack of marks. This requires a special placement of the fields: Columns of fields can be aligned with spaces between each column. These spaces are supposed to have the width of the header field 43.

Figure 5:
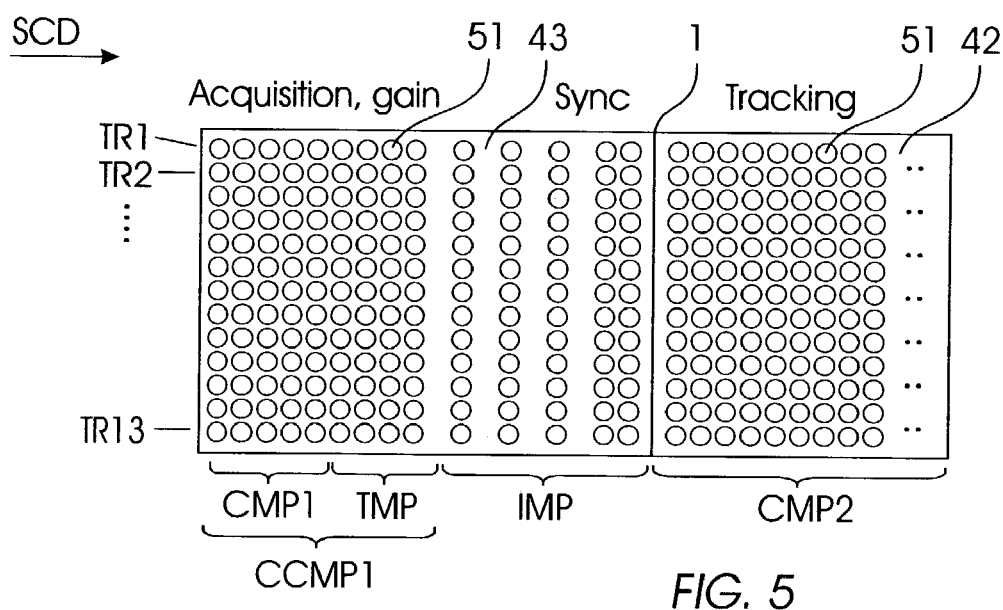
FIG. 5 illustrates a header field and a clock field of the storage medium in a first embodiment according to the present invention.

FIG. 5 shows a top view of a part of the field array 4 illustrated in FIG. 4. It presents the clock mark field 42 of FIG. 4 together with the header field 43 according to FIG. 4. The clock mark field 42 as well as the header field 43 include several tracks TR1 ... TR13. The associated probe is following the scanning direction SCD during scanning mode. Along the tracks TR1 ... TR13 there are marks 51 designed for determining clock and other operational data. Clock marks 51 in FIG. 5 have physical properties of indentations—depicted as circles—and non-indentations—not depicted, but still representing logical values. Presence of a mark indentation corresponds to a logical "1", absence of an indentation corresponds to a logical "0". All indentations—also called pits—are nominally of equal depth and size, and are placed at a fixed horizontal distance from each other along a track TR.

Certain alignments of clock marks 51 represent mark patterns CMP1, TMP, IMP and CMP2. These mark patterns CMP1, TMP, IMP and CMP2 are repeated in each track TR. This is advantageous, since a field is usually scanned track by track, so that clock and other operational information can be determined continuously. A track of the header field 43 is scanned and read before an assigned track of the clock mark field 42 is scanned and read. The header field 43 is covering a smaller area on the storage medium than the other fields 41 or 42.

The header field 43 includes the mark patterns CMP1, TMP, and IMP, while the clock mark pattern 41 includes the mark pattern CMP2. The first clock mark pattern CMP1, the threshold mark pattern TMP and the indication mark pattern IMP of the header field 43 are used for initial synchronization and may be interpreted as a preamble, followed by the second clock mark pattern CMP2 of the clock mark pattern field 41, completely filled with logical "1", so being entirely covered with indentation marks for tracking the optimum clock phase during normal reading operations. The transition between the preamble/header field 43 and the clock mark pattern field 41 should be reliably detected, as it also indicates to the remaining storage fields 42 the start of data records in form of data marks.

Mark patterns can be expressed in another way by a binary data vector sp=[ao, as, ar], where ao is a preferred binary data vector of length 8No (No bytes) representing the first clock mark pattern CMP1 and the threshold mark pattern TMP with all marks representing the value "1". as is a preferred binary vector of length 8Ns (Ns bytes) representing a part of the indication mark pattern IMP, given by the repetition of the sequence (0, 1, 0, 1, 0, 1, 0 1), and ar is a binary vector of length 2 given by the string (1,0), representing a second part of the indication mark pattern IMP.

Figure 6:
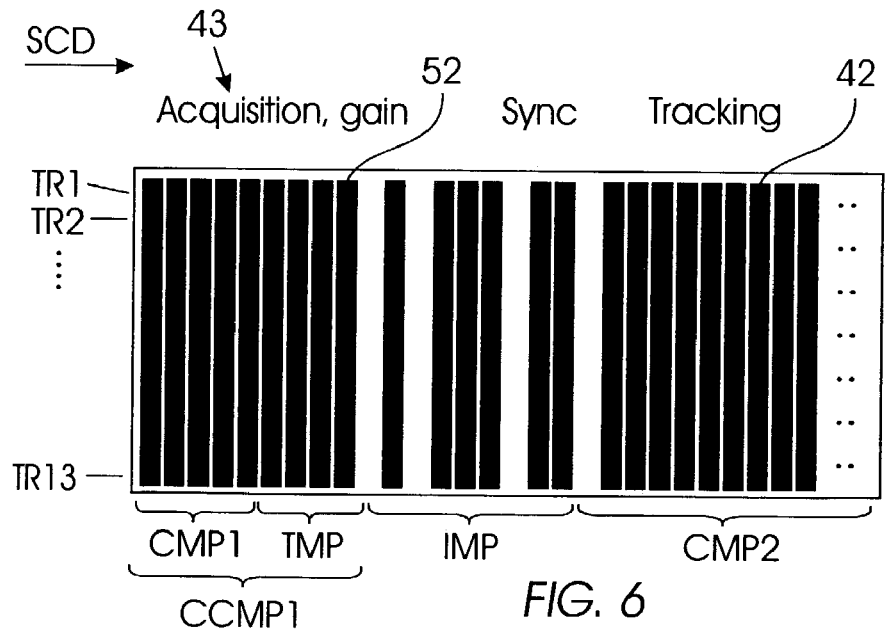
FIG. 6 illustrates a header field and a clock field of the storage medium in a second embodiment according to the present invention.

FIG. 6 corresponds to FIG. 5 and shows also the header field 43 and the clock mark field 42 with corresponding mark patterns. The only difference is, that vertically aligned marks are linked to vertical grooves. Track alignment and scanning direction remain the same. Benefit of this embodiment is, that clock information can be derived from these fields 43 and 42 even when the associated probe is set vertically off track.

Assuming that the initial frequency offset is within a predetermined small range, usually ±100 part-per-million (PPM), the following steps are proceeded:

1) reading the first clock mark pattern CMP1 and acquiring a first approximation of a clock phase;
2) reading the threshold mark pattern TMP and estimating an overall channel gain needed to set a threshold for threshold detection;
3) reading the indication mark pattern IMP and detecting the transition between the header field 43 and the clock mark field 42;
4) reading the second clock mark pattern CMP2 and tracking the optimum clock phase.

As velocity V for moving the probes across the storage medium is known, and the mark distance S between consecutive marks is known, generally only one reading pulse is to be fired every T seconds for data mark detecting purposes, with T=S/V, provided the pulse is fired at the right time when the probe meets the mark center. T is also referred to as modulation interval.

Mathematically, with assuming a linear read channel model, a response signal to a reading pulse, also called channel output signal, for a sequence of N written bits, at the sampling instant tk can be expressed as $$r_k(\epsilon) = r(t_k, \epsilon) = \Sigma_{n=0}^{N-1} a_n A g(t_k - nT - \epsilon T) + w_k$$

where an is a binary symbol with values taken from the alphabet {0, 1}, T denotes the modulation interval, As the overall channel gain, g(t) is the overall channel impulse response, epsilon is a possibly slowly time-varying phase shift with respect to an ideal reference clock, and wk is an additive noise sample.

Since the phase of the clock at the particular instant when a particular probe meets a clock mark center is not initially known, a series of pulses is fired within the period T when the associated probe is scanning the header field 43 for sampling the deflection of the probe on its way from a first clock mark 51 to a second clock mark 51. Applying this series of pulses is also referred to as oversampling. At least clock marks 51 of the first clock mark pattern CMP1 are oversampled. The second clock mark pattern CMP2 in the clock mark field 41 is also preferably read in the oversampling mode. In case there are more tip shaped probes for parallel mark scanning, preferably only the probe reading the header field 43 and the clock mark field 42 is committed to scan its clock marks in the oversampling mode. The other data mark reading probes are preferably not subject to oversampling in order to reduce power consumption.

Figure 7:
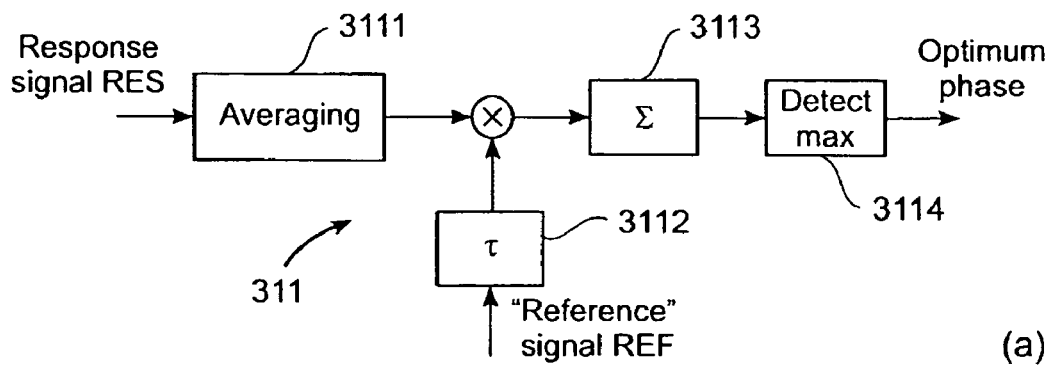
FIG. 7a illustrates a block diagram of an estimation circuit for initial determination of the clock according to the present invention.
FIG. 7b illustrates corresponding input signals.
Figure 7:
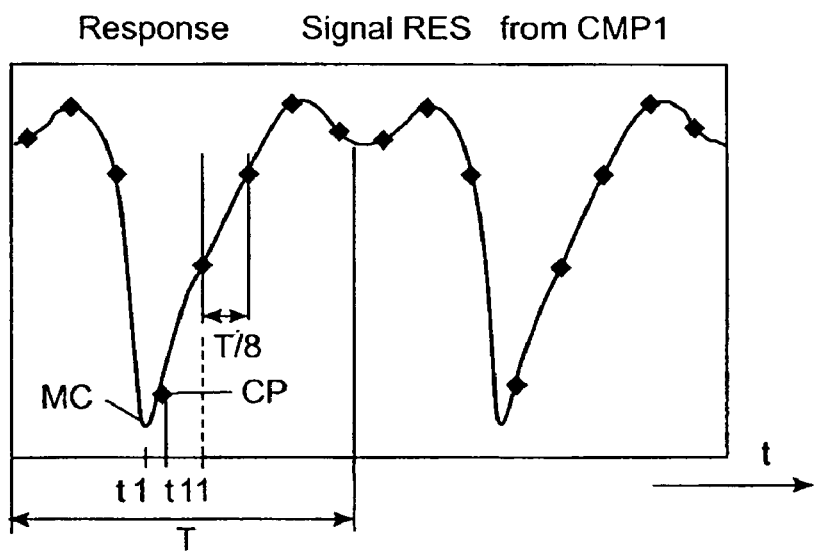

When applying reading pulses to a probe, a response signal is received that shows the deflections of the probe due to topographic mark structures in its course. Such a response signal RES to oversampling pulses over time t is shown in FIG. 7b. The response signal RES is a discrete signal, having values characterized in FIG. 7b with rhombic signs. The part of the response signal RES shown in FIG. 7b is the response of scanning two "1"—marks of the first clock mark pattern CMP1. As can be derived from FIG. 7b, this first clock mark pattern CMP1 preferably consists of exclusively "1" clock marks 51, as "0" marks do not lead to a deflection of the probe and therefore ideally show a constant zero level in the response signal RES. Oversampling factor is eight, so eight samples are generated every T seconds. Oversampling the first clock mark pattern CMP1 helps in determining an initial phase of the clock.

In addition FIG. 7b shows an instant t1, at which a reading pulse for mark detection should be fired, since the associated probe would meet the mark center and would deliver an absolute maximum value MC. With the actually applied oversampling reading pulses, the pulse fired at time t11 and delivering value CP comes most close to the aforementioned time t1 and its corresponding value MC. But a better instant can be derived from scanning the first clock mark pattern CMP1. FIG. 7a shows an estimation circuit 311 in a block diagram for supplying an initial phase adjustment.

According to FIG. 7a, the response signal RES is correlated with a reference signal REF by means of the phase estimation unit 311 to estimate the optimum phase. Before correlating, the response signal RES is conducted to averaging means 3111 for filtering noise and other disturbances. The reference signal REF represents an ideal response signal of sequentially scanned "1"—indentation marks. The time basis is known for the reference signal REF. Reference signal REF can be an analog signal or have discrete values.

Reference signal REF and response signal RES are correlated in a way, that the reference signal REF is shifted with factor Tau represented with a time shift block 3112 in FIG. 7a—over the response signal RES. So factor TAU represents a shift in time between response signal RES and reference signal REF. For every value of TAU the time-corresponding values of the response signal RES and the reference signal REF are multiplied and the results of the multiplications are added in an adder 3113 to yield a correlation value.

In the end, a comparator 3114 is comparing these correlation values. The comparator 3114 detects the maximum of correlation added values. The highest correlation value is reached, when reference signal REF and response signal RES are overlapping best. There is a certain shift in time TAU=epsilon corresponding to this detected highest correlation value. Since the time basis for the reference signal REF is known as well as the time shift TAU=epsilon has been estimated to identify the highest correlation value and hence a maximum in the response signal RES, the instant at which the response signal RES reaches its maximum can be estimated and therefore a reading pulse can be fired at this particular instant.

The time precision of meeting the mark center with an applied reading pulse is dependent on an oversampling factor for the reference signal REF in case the reference signal REF is a discrete signal. The larger the oversampling factor applied to the reference signal REF is, the more precise the phase of the clock such that a reading pulse is applied to the cantilever when it meets the mark center can be estimated.

Mathematically, the estimate epsilon of a phase shift epsilon is obtained by resorting to a correlation method and relying on the knowledge of the predefined binary vector ao. The estimate epsilon is given by $$E=(1/T)\max(\text{over } \tau)\{\Sigma^{Q-1}_{n=0} r_n(\epsilon)\text{gref}(n^{T/Q}-\tau)$$

Where gref represents an ideal reference signal REF over one period T of a channel impulse response which closely resembles an actual impulse response, and where gref(t) denotes a periodic repetition of gref(t) with period T, where {rn(epsilon), n=0, ..., Q−1} represents a sequence of samples of the response signal RES, where the sequence of samples {m(epsilon), n=0, ..., Q−1} is obtained by first removing a dc-offset, then averaging over NA<8No modulation intervals the channel output sequence.

It has been observed that a simple approximation of the reference signal to a triangular waveform is sufficient for proper phase acquisition. Therefore, no complex channel identification techniques are needed.

Determining an at least approximate optimum phase according to FIGS. 7a and 7b gives a first step to determine the phase of the clock for future reading pulses RP.

FIG. 5 shows a threshold mark pattern TMP following the first clock mark pattern CMP1 in the header field 43. The threshold mark pattern TMP is used for determining a threshold for mark classification purposes. When detecting a mark by means of firing a reading pulse, the response to this reading pulse has to be evaluated, whether it meets certain criteria. This can include a comparison of the response value to a threshold. When the response value exceeds the threshold, an indentation and e.g. a binary "1" is detected, if not, a binary "0" is detected. A corresponding mark pattern TMP is in charge of delivering support in determining the threshold. In case, a mark can be represented by an indentation or a non-indentation, the threshold mark pattern contains a series of indentations, usually representing a binary value "1", see FIG. 5.

Figure 8:
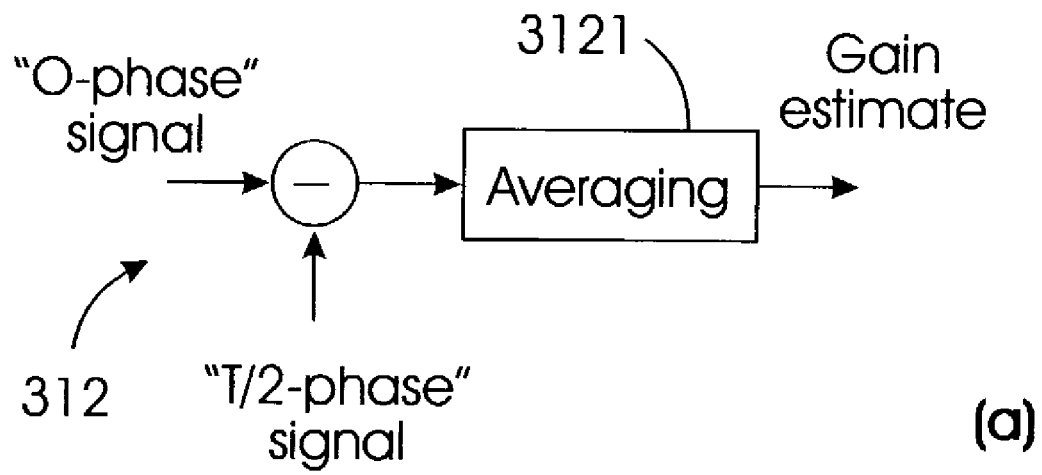
FIG. 8a is a block diagram of a gain estimation unit according to the present invention.
FIG. 8b shows a corresponding input signal.
Figure 8:
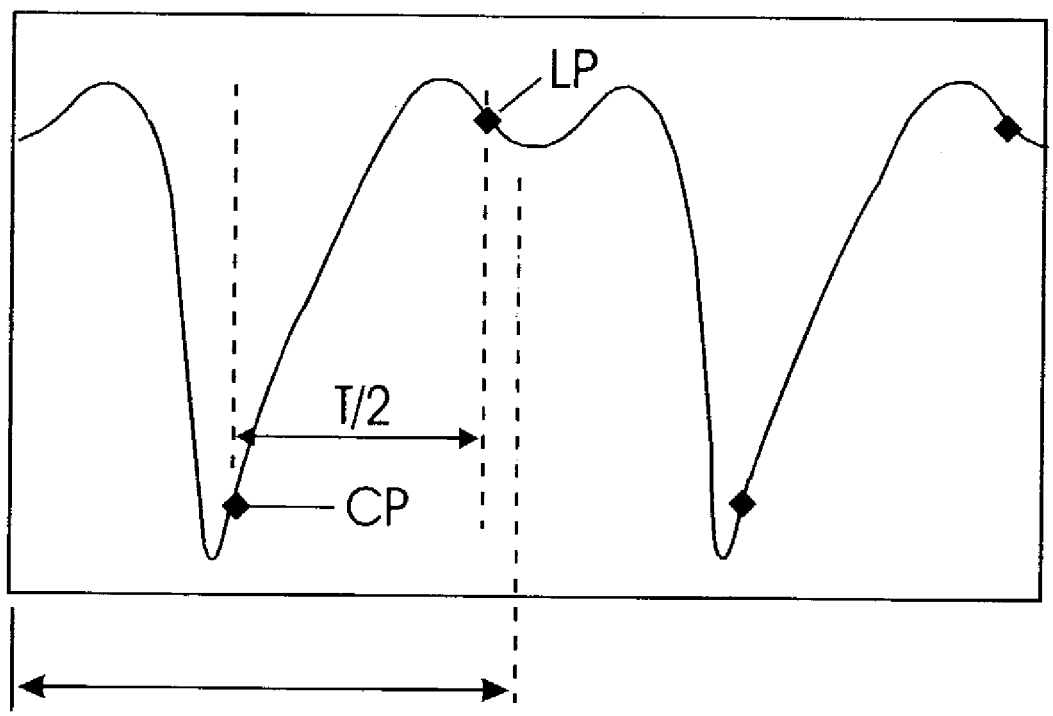

A response signal RES from the threshold mark pattern TMP is applied to a gain estimation circuit 312 according to FIG. 8a. FIG. 8b shows such a response signal RES over the period of scanning two indentation marks with only two samples per period T, which requires an oversampling factor of at least Q=2. These two samples identify the values CP and LP within one period T of the response samples. The two reading pulses can be placed accordingly, since the above described phase determination identifies at least a preliminary optimum phase for firing a reading pulse to get value CP for response. Accordingly, value LP is acquired when firing a reading pulse T/2 seconds later. The respective two values CP and LP are subtracted according to FIG. 8a. The absolute value acquired from subtracting the values CP and LP is also called gain.

Another way of performing this calculation is to take the value CP of the response signal RES, in diagram 8a called the "0-phase-signal" and subtract instantaneously the value from a T/2-phase shifted "T/2-phase signal". When the value CP is obtained in the "0-phase signal", simultaneously the value LP is obtained in the "T/2-phase signal", so the two values CP and LP can be subtracted immediately. Applying this calculation to a series of values CP and LP of many periods T when scanning over a plurality of indentation marks, the subtracting results can be averaged by a corresponding unit 323. This averaged gain is preferably divided by two to end with a threshold value for mark classification.

As both the first clock mark pattern CMP1 and the threshold pattern TMP contain indentation marks, representing "1's", these two patterns can be merged into a single clock and threshold pattern CCMP1 according to FIG. 5, even with initial phase acquisition and gain estimation performed in parallel.

According to FIG. 5, the next mark pattern in sequence is the indication mark pattern IMP. This indication or sync mark pattern IMP consists of a repetition of the special 8-bit word (0, 1, 0, 1, 0, 1, 0, 1) followed by the binary string (1, 0), according to FIG. 5 and FIG. 9*b*.

Figure 9:
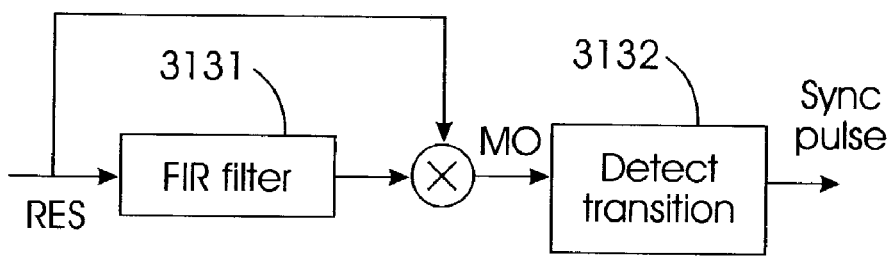
Figure 9:
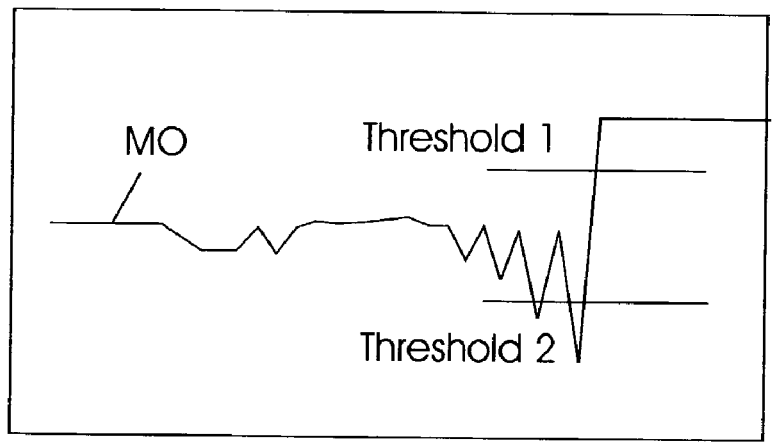

FIG. 9*a* shows a block diagram of an indication mark pattern detection circuit 313. The end of the indication mark pattern indicates the transition between clock estimation and threshold acquisition mode described above and clock tracking mode described below. Detection is based on a correlation method. A sync pulse is generated to indicate this transition. The sync pulse generation is achieved by first filtering the response signal RES by an 8-tap FIR filter 3131 with integer coefficients (+1, −1, +1, −1, +1, −1, +1, −1) and then multiplying the filter output by the response signal RES. A sharp transition in the obtained sequence of multiplier output serves as an indicator for the beginning of clock marks in the clock mark field 42 as well as for the beginning of data in the data storage fields 41. This sharp transition in the multiplyer output is detected by a transition detector 3132.

FIG. 9*b* illustrates the basic principle for the case Ns=1. The last columns of numbers represents the sequence of multiplier output. The multiplier output is shown in a diagram in FIG. 9*c* over time and operation of the transition detector 3132 is illustrated. Consecutive multiplier output values are compared with two thresholds number one and number two. In case the multiplier output MO is below threshold number two and the next multiplier output value MO is above threshold number one, a sharp transition is detected and the sync pulse is provided. In FIG. 9*c* a sharp transition from values −4 to +3 occurring in correspondence with the reversal of the data pattern from (0 1) to (1 0) can be detected by the transition detector 3132 of FIG. 9*a*. The initial estimate of the gain according to FIG. 8 allows the transition detector 3132 to set thresholds and very reliably detect this reversal. By increasing the length of as, the size of the transition also increases, thereby rendering the detection of the beginning of information data extremely accurate even under severe noise or frequency offset conditions.

Figure 10:
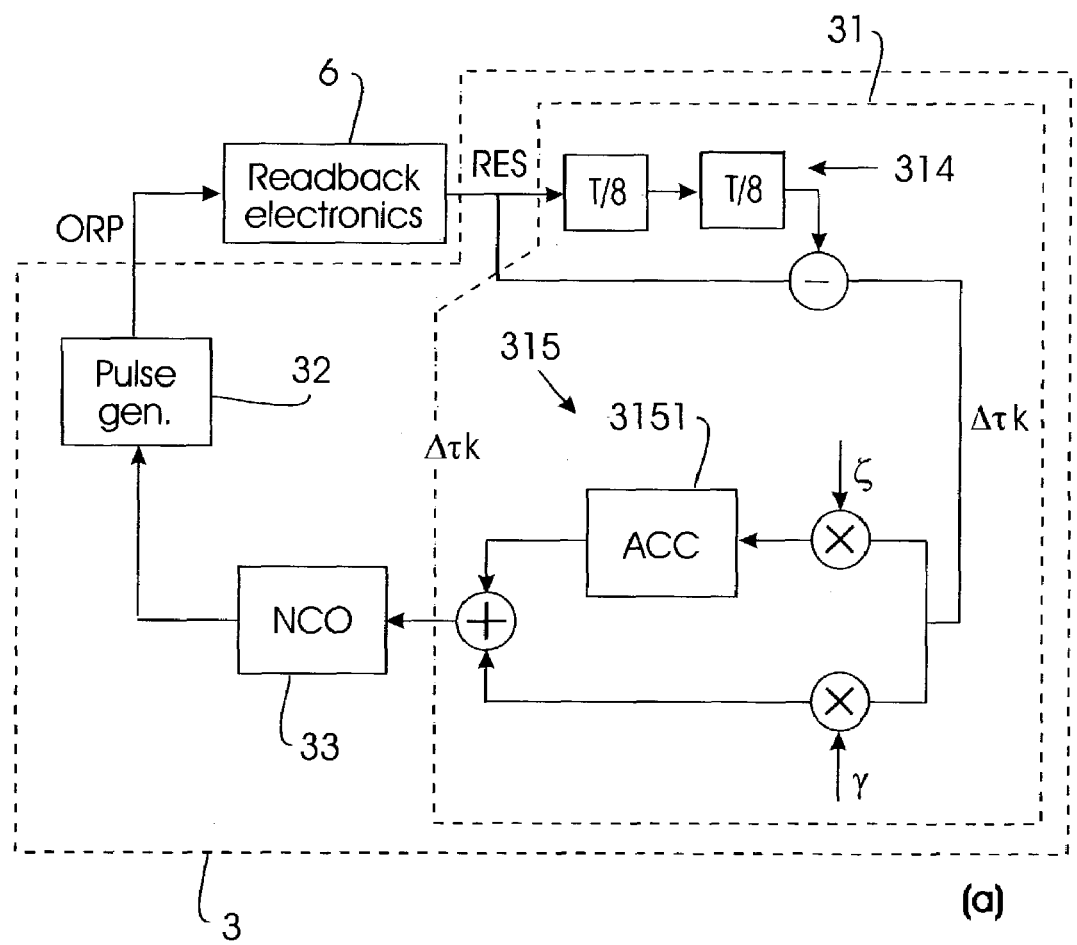
FIG. 10a illustrates a control unit according to the present invention.
FIG. 10b illustrates a corresponding input signal.
Figure 10:
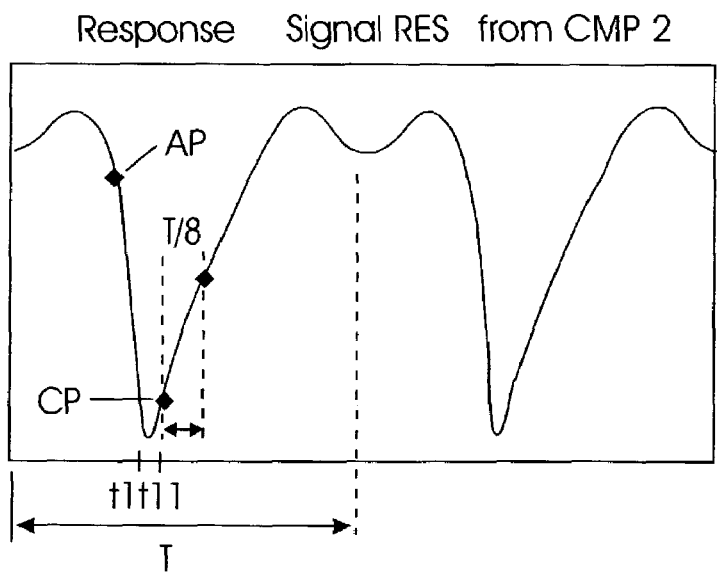

FIG. 10*a* shows a control unit 3 according to the present invention, comprising a determination unit 31, oscillating means 33 and a pulse generator 32.

The clock mark scanning probe is provided with oversampling reading pulses ORP from the pulse generator 32. The pulse generator 32 itself can also deliver non-oversampling reading pulses to data mark scanning probes. The pulse generator 32 is controlled by oscillating means, so that the pulse generator 32 fires reading pulses with a determined frequency and phase. Oversampling reading pulses are applied to the clock mark scanning probe. Appropriate readback electronics 6, for example, a thermoelectrical sensor including amplifying and filtering elements, deliver a response signal RES to the applied oversampling reading pulses ORP. The determination unit 31 is fed with the response signal RES.

The determination unit 31 deals with determining the clock of the pulsed reading signal RP using the second clock mark pattern CMP2 of the clock mark pattern field 41 according to FIG. 5. This clock determination is achieved by adjusting the phase and frequency of the clock obtained by using the first clock mark pattern CMP1. It allows determining the phase and frequency of the clock so that the reading pulses are fired to meet the instant, at which the probes are crossing the mark centers. This ongoing fine-adjustment process is also called tracking of the optimum sampling phase.

FIG. 10*b* shows a response signal RES over two periods T, when scanning two "1" mark indentations of clock mark field 42 in an oversampling mode. According to FIG. 10*b*, at least three reading pulses are fired each period T leading to respective response values shown with rhombic signs. These three sample values are of particular interest. The CP value at instant t11 meets the mark center most close as obtained by using the first clock mark pattern CMP1 and the corresponding phase estimation unit 311 according to FIG. 7. The sample value AP is the response value according to the pulse fired T/Q seconds before t11 from the pulse generator, with an exemplary oversampling rate Q=8. The sample value BP is the response value according to the pulse fired T/Q seconds after the time t11.

The determination unit 31 comprises a delay circuit 313, delaying each response value of the response signal RES for twice T/Q seconds. The delayed value is subtracted from the actual value. Of special interest is the difference between the values AP and BP. Provided the oversampling factor Q is sufficiently large, the difference between these two particular values AP and BP shows the deviation of the actual sampling phase from the optimum sampling phase. The optimum sampling phase is indicated in FIG. 10*b* with the time mark t1, when the mark center would be met with a reading pulse fired at time t1 and a response value MC would be generated.

This deviation DELTA Tau k is computed as DELTA Tau k=r(kQ+1)−r(kQ−1) with r(kQ+1), r(kQ−1) representing the values BP and AP according to FIG. 10*b*. This estimate of the phase deviation Delta Tau k is input to a second-order loop filter 312 which provides an output given by Delta T k=sk+ Iota Delta T k, where a discrete time integrator 3121 is recursively updated as s(k=1)=sk+Eta Delta Tau k. The second-order loop filter 312 transfers the estimate of the phase deviation Delta Tau k into a control signal for controlling the frequency and phase of the oscillator means 33. Several tuning parameters are shown.

So the second-order loop filter output Delta T k determines the control signal for a voltage controlled oscillator VCO representing the oscillating means 33. Clearly, the voltage controlled oscillator can be implemented either as an analog oscillator or a discrete numerically controlled oscillator NCO, see FIG. 10*a*. In the former case a digital-to-analog converter is required to convert the control signal from the digital to the analog domain.

The oscillator means 33 act as a further integrator in the loop. Therefore, a constant control signal Delta T k will result in change of the frequency of the NCO, whereas a control signal of finite duration will result in a change of the NCO phase.

The same basic principles shown in the previous embodiments can also be applied in the case when a dedicated header field 43 with the above illustrated mark patterns and a dedicated clock mark field 42 with clock marks representing clock information are not available, or when a storage medium is scanned by a single probe. In these cases, at least one designated data storage field contains the first clock mark pattern and the threshold mark pattern or a combined clock mark pattern, which allow to estimate the optimum phase and the gain. It is advantageous to provide also an indication mark pattern to obtain a reliable indication of the end of clock and other operational data marks and the beginning of data marks. Tracking is then accomplished by a decision aided second-order loop similar to the one proposed in the previous section. A designated data field that is being used to provide in addition timing information operates in an oversampled mode. During tracking mode the input signal to the oversampling loop filter is given by Delta Tau k=ak(r(kQ=1)−r(kQ−1)), where ak denotes the detected bit value.

While the invention has been described with respect to certain preferred embodiments and exemplifications, it is not intended to limit the scope of the invention thereby, but solely by the claims appended hereto.

We claim:

1. A storage device, comprising:
   a. a storage medium for storing data in the form of marks,
   b. at least one probe designed for scanning said storage medium in a scanning mode,
   c. a control unit providing a pulsed reading signal for data detecting in said scanning mode and providing the probe with oversampling reading pulses in a clock mark scanning mode, and comprising
      i) an input for a response signal to said oversampling reading pulses; and
      ii) a determination unit for determining said clock dependent on said response signal; and
   d. wherein said storage medium comprises marks for determining a clock of said pulsed reading signal.

2. The storage device according to claim 1 wherein said storage medium comprises a clock mark pattern for determining an approximation of said clock.

3. The storage device according to claim 1 wherein said determination unit comprises a phase estimation unit for determining an initial phase adjustment of said clock.

4. The storage device according to claim 1 wherein said storage medium comprises a clock mark pattern for determining said clock.

5. The storage device according to claim 4 wherein said storage medium comprises an indication mark pattern indicating the beginning of a second clock mark pattern.

6. The storage device according to claim 1 wherein said determination unit comprises a filter.

7. The storage device according to claim 1 wherein said storage medium comprises a threshold mark pattern for determining a threshold for mark classification purposes.

8. The storage device according to claim 1 wherein mark patterns are arranged in a scanning direction as follows: a first clock mark pattern, a threshold mark pattern, indication mark pattern and a second clock mark pattern.

9. The storage device according to claim 1 comprising an array of probes wherein
   a. said storage medium has fields with each field to be scanned by an associated one of said probes, and
   b. one of said fields comprises clock marks.

10. The storage device according to claim 9 wherein said storage medium comprises a header field being adjacent to only one of said fields, and said header field has an associated scanning probe scanning both said header field and an adjacent field.

11. The storage device according to claim 10 wherein said header field comprises a first clock mark pattern, a threshold mark pattern, and an indication mark pattern.

12. The storage device according to claim 9 wherein said control unit is designed for applying said pulsed reading signal to several field waning probes.

* * * * *